United States Patent Office

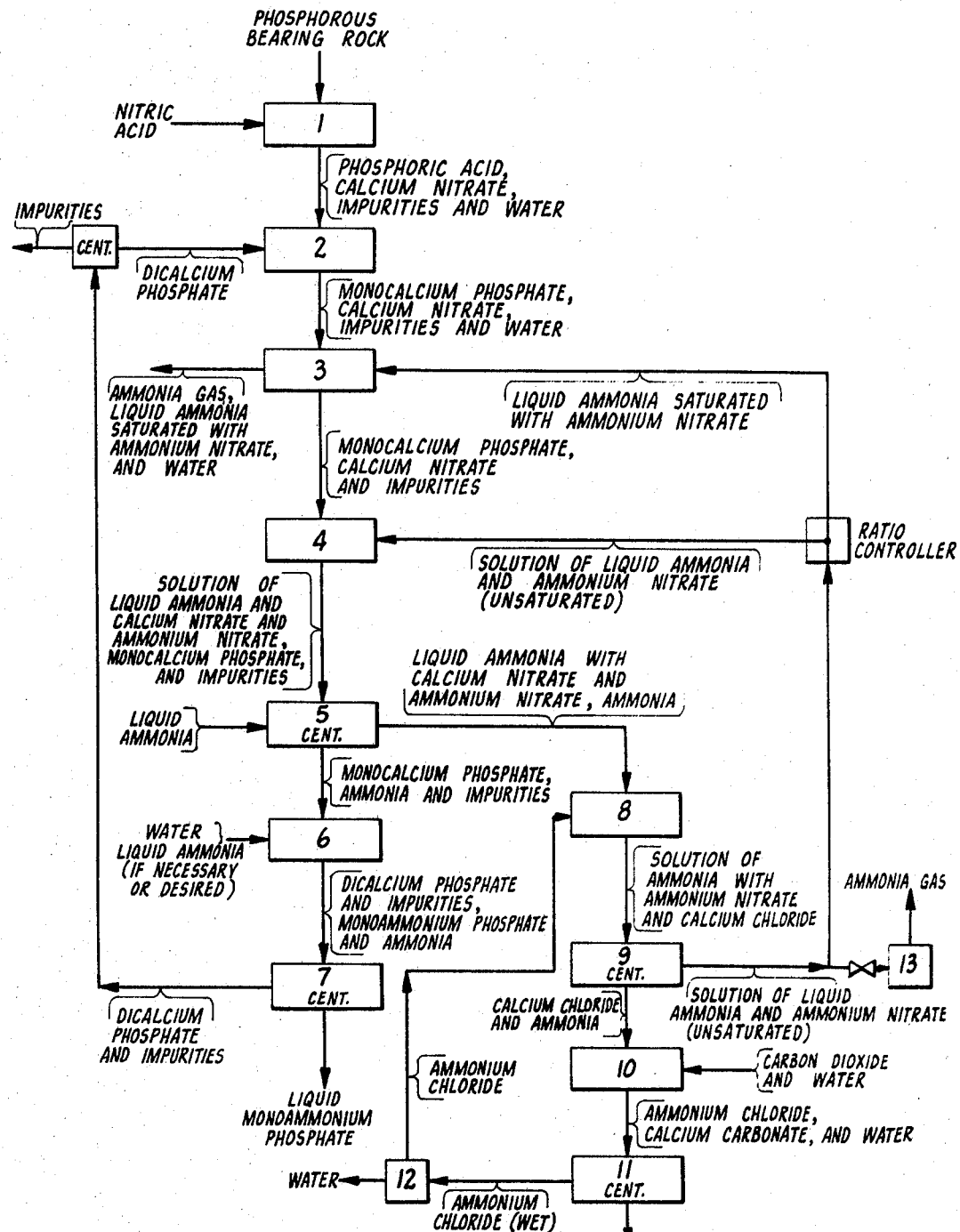

3,472,616
Patented Oct. 14, 1969

3,472,616
PROCESS FOR THE PRODUCTION OF MONOAMMONIUM AND DIAMMONIUM PHOSPHATE
Douglas O. Hauge, Moraga, Calif., assignor to B. D. Bohna & Co., San Francisco, Calif., a corporation of California
Filed July 7, 1966, Ser. No. 563,402
Int. Cl. C01b 25/32
U.S. Cl. 23—107          12 Claims

ABSTRACT OF THE DISCLOSURE

Monoammonium phosphate and diammonium phosphate, useful as fertilizers, are prepared from phosphorus-bearing rock through a series of reactions including initially treating the phosphorus-bearing rock with nitric acid to form a slurry of phosphoric acid, calcium nitrate, impurities, and water; dicalcium phosphate is added to the slurry to convert the phosphoric acid thereof to monocalcium phosphate. The water of the slurry is removed by treatment of the latter with liquid ammonia saturated with ammonium nitrate. An unsaturated solution of liquid ammonia and ammonium nitrate is then added to the dehydrated slurry to remove calcium nitrate. The liquid ammonia and ammonium nitrate from the removal treatments are separated and recycled for further use, while the calcium nitrate may be used as a fertilizer. The monocalcium phosphate and impurities remaining after the removal of the calcium nitrate are treated with water and liquid ammonia to form insoluble dicalcium phosphate and impurities, and dissolved monoammonium phosphate. The solids are separated and the dicalcium phosphate is recovered therefrom and reused; the liquid monoammonium phosphate is recovered and may be treated with additional ammonia to form diammonium phosphate.

---

The invention relates to processes for the production of phosphatic materials used in the manufacture of inorganic fertilizers from phosphate-bearing rock. More particularly, the invention relates to processes for the preparation of phosphate salts which may be used in the preparation of nitrogen- or phosphorus-containing inorganic fertilizers of high purity and water solubility. The invention utilizes phosphate-bearing rock and nitric acid as starting materials.

Heretofore, conventional fertilizer manufacture has, for the most part, utilized sulphuric acid as the means for obtaining the acidulation of phosphate rock. Because of the increasing demand for high analysis fertilizers and the increasing shortage and cost of sulphuric acid, increasing resort has been had to the acidulation of phosphate rock with nitric acid. Utilization of nitric acid as the acidulating medium, however, introduces a number of problems.

A serious disadvantage to nitric acid processes heretofore known has been their failure to produce completely water soluble fertilizers. Previously known processes have resulted either in fertilizers that were only citrate soluble or only partially water soluble. Moreover, the fertilizers so produced have not been notably high in their nitrogen and phosphorus analysis.

Another problem is that the treatment of the phosphate rock with nitric acid results in the formulation of calcium nitrate. Calcium nitrate is extremely hydroscopic and imparts undesirable characteristics to the fertilizer product such as a tendency to agglomerate. Accordingly, it is necessary to extract the calcium nitrate during the manufacture of the phosphate fertilizers in order to obtain a satisfactory end product. Attempts have been made to extract the calcium nitrate through the use of liquid ammonia. However, it has been found necessary to either remove the impurities from the acidulated rock prior to the extraction of the calcium nitrate by the liquid ammonia or to remove the water normally present in the slurry. Neither of these alternatives has been accomplished heretofore in a completely satisfactory manner.

One object of the present invention is to produce phosphate salts, in a process using nitric acid for the acidulation of the phosphate rock which may be used in the preparation of inorganic fertilizers having high chemical analysis of phosphorus and nitrogen and high solubility in water.

Another object of the invention is to produce phosphate salts which may be used in the preparation of inorganic fertilizers that are essentially free of impurities such as metallic oxides and silicates.

A further object of the invention is to provide a satisfactory method for removing the water from the phosphate rock after it has been acidulated with nitric acid.

Another object of the invention is to utilize either liquid ammonia or a solution of liquid ammonia with ammonium nitrate to extract the calcium nitrate produced by the acidulation of the phosphate-bearing rock by the nitric acid.

Another object of the present invention is to provide a process in which the liquid ammonia and ammonium nitrate utilized to extract the calcium nitrate may be recycled and reused so as to extend the calcium nitrate extraction capacity of the liquid ammonia.

Still another object of the invention is to obviate, as far as possible, the necessity for recompressing any of the ammonia into liquid form after the extraction of the calcium nitrate by the ammonia.

Further objects and advantages of the invention will become apparent to those skilled in the art from the following description and disclosure.

The invention will be more readily understood by referring to the accompanying flow sheet in which the principal steps of the process are schematically illustrated. Crude phosphorus-bearing rock, such as ground apatite rock, is treated with 60% nitric acid at step 1. The resultant mixture of this treatment comprises a slurry of phosphoric acid, calcium nitrate, certain impurities including mixed iron and aluminum oxides and silicates and water. The acidulated rock slurry is then further reacted with stoichiometric amounts of dicalcium phosphate at step 2 to convert the phosphoric acid to monocalcium phosphate. The purpose of this step is to produce a phosphate salt which is soluble in water but not soluble in liquid ammonia. This may be done by using chemicals other than dicalcium phosphate, however, the dicalcium phosphate is a preferred material. The following simplied equations exemplify the reactions involed:

(I)  

(II)  

Initially, the dicalcium phosphate must be supplied from an outside source. However, once the process is established, dicalcium phosphate is produced as a by-product in step 6 and this by-product is separated out in step 7 and then recycled to step 2 to treat the slurry produced by the acidulation of the phosphate rock.

In step 3 the slurry is passed through a solution of liquid ammonia that is saturated with ammonium nitrate. This is accomplished with physical agitation of the slurry as it is passing downwardly through a suitable heat exchanging device. The agitation causes the slurry to be continually dispersed against the walls of the column. Since the solution of ammonia with ammonium nitrate surrounds the column there is a heat exchange from the slurry to the ammonia solution which serves to chill the slurry thereby aiding in its solidification. The slurry is then physically dispersed in the liquid ammonia-ammonium nitrate solution where the water in the slurry is removed through its absorption by the liquid ammonia-ammonium nitrate. The calcium nitrate, although soluble in the solution, is not picked up due to the fact that the liquid ammonia is saturated with ammonium nitrate and has no further capacity to dissolve calcium nitrate. Accordingly, the monocalcium phosphate, calcium nitrate, and the impurities pass on through the column while the saturated solution of liquid ammonia and ammonium nitrate plus the water go off.

Due to the heat exchange which occurs between the slurry and the solution, there will also be an evolution of gaseous ammonia. This gaseous ammonia can be utilized in two ways. It can be used in the manufacture of the nitric acid used in the acidulation of the phosphate-bearing rock. It can also be used at a later stage in the ammoniation of the monoammonium phosphate and the production of diammonium phosphate as will be explained more fully hereinafter. The liquid ammonia in the ammonia-ammonium nitrate solution is evaporated to produce ammonium nitrate in powder form which may be sold as a separate by-product.

As a result of the preceding step, the dehydration of the slurry is accomplished in an easy and simple manner. The dehydrated slurry is then passed through a solution of liquid ammonia and ammonium nitrate (step 4). But in this case, the liquid ammonia is not saturated with the ammonium nitrate. Since it is not saturated, the liquid ammonia retains the capacity of dissolving the calcium nitrate. Accordingly, the calcium nitrate dissolves in the liquid ammonia-ammonium nitrate solution. The monocalcium phosphate and impurities, however, do not dissolve since they are not soluble in the solution. In this way, the calcium nitrate is mechanically separated from the water soluble phosphate salt. Physical separation occurs in the next step, step 5, where the liquid ammonia with the ammonium nitrate, and the calcium nitrate which it has picked up, and the monocalcium phosphate and impurities are sent to a centrifuge. At this point, liquid ammonia is added to convert the dry materials to a slurry, although, it could have been added in the preceding step if desired. While the addition of pure liquid ammonia in the preceding step would have the advantage of increasing the amount of calcium nitrate which could be extracted since the ammonia would not be burdened with any ammonium nitrate, nevertheless, the utilization of a solution of ammonium nitrate in liquid ammonia does have the advantage of sufficiently raising the boiling point of the solution so as to materially lessen the problems of handling the liquid ammonia. At the centrifuge, the liquid ammonia with the ammonium nitrate and the calcium nitrate and some fresh ammonia is taken off separately from the monocalcium phosphate with any occluded ammonia that may be present with it, and the impurities. These products are treated in a manner to be described separately hereinafter.

The monocalcium phosphate, impurities and any occluded ammonia separated by the centrifuge are washed with water, and additionally wit hammonia, if necessary or desired (step 6). This treatment produces dicalcium phosphate and monoammonium phosphate. The impurities are carried along with the dicalcium phosphate and all the products are passed to a centrifuge (step 7) where the liquid monoammonium phosphate is separated out. This material makes an excellent fertilizer in and of itself, although, it is preferred to further treat this material with a portion of the ammonia gas produced in step 3 to convert it to diammonium phosphate. This material is then processed in the ordinary manner to produce a fertilizer of very high analysis and purity. The diammonium phosphate so produced by the present process has little or no inert material and is equivalent in analysis to diammonium phosphate as currently produced from furnace grade phosphoric acid. The dicalcium phosphate and impurities separated by the centrifuge in step 7 are then further centrifuged to remove the impurities and the purified dicalcium phosphate is returned to the process at step 2 where it is used to neutralize the phosphoric acid.

Referring back to step 5, the solution of liquid ammonia with ammonium nitrate and calcium nitrate discharged from the centrifuge is reacted with ammonium chloride to form a solution of ammonium nitrate in liquid as well as calcium chloride which precipitates out. The following simplified equation exemplifies the reactions involved:

$$Ca(NO_3)_2 + 2NH_4Cl \rightarrow CaCl_2\downarrow + 2NH_4NO_3$$

This reaction adds ammonium nitrate to the process. The precipitate of calcium chloride is removed in a centrifuge at step 9 while the unsaturated solution of ammonium nitrate in liquid ammonia passes through a ratio controller which monitors the concentration of the ammonium nitrate in the ammonia. If the solution is not saturated it is recycled back to step 4 of the process and utilized to extract additional amounts of calcium nitrate. However, when the liquid ammonia becomes saturated with the ammonium nitrate the ratio controller recycles the solution back to step 3 of the process where the solution is used to dehydrate the slurry. In the event that the gaseous ammonia requirements for the nitric acid plant and the ammoniation of the mono-ammonium phosphate cannot be met from the quantities of saturated solution in the process, additional amounts of unsaturated ammonia-ammonium nitrate solution may be bled off from the recycle line leading to step 4 and heated (step 13) to drive off enough ammonia gas to make up any deficiencies.

The calcium chloride and any occluded ammonia are reacted with water and carbon dioxide in step 10 to form a solution of ammonium chloride and calcium carbonate. These products are passed to a centrifuge (step 11) where the calcium carbonate is removed. The wet ammonium chloride is further processed (step 12) to remove the water and then recycled to step 8 where it is again used to remove the calcium from the calcium nitrate.

What is claimed is:

1. In a process for the production of mono- and diammonium phosphate from the acidulation of phosphorus-bearing rock with nitric acid, the steps of treating the acidulated rock slurry to produce a water soluble phosphate salt that is insoluble in liquid ammonia and dehydrating the slurry by passing it through a solution of liquid ammonia saturated with ammonium nitrate.

2. In a process for the production of mono- and diammonium phosphate from the acidulation of phosphorus-bearing rock, with nitric acid, the steps as set forth in claim 1 with the additional step of passing the dehydrated slurry through an unsaturated solution of liquid ammonia and ammonium nitrate to dissolve calcium nitrate.

3. In a process for the production of mono- and diammonium phosphate from the acidulation of phosphorus-bearing rock with nitric acid, the steps as set forth in claim 2 with the additional step of reacting the solution of liquid ammonia with ammonium nitrate and calcium nitrate with ammonium chloride to form a solution of liquid ammonium nitrate and a precipitate of calcium chloride.

4. In a process for the production of mono- and diammonium phosphate from the acidulation of phosphorus-bearing rock with nitric acid, the steps as set forth in claim 3 wherein the solution of liquid ammonia and ammonium nitrate is recycled and utilized to dissolve additional amounts of calcium nitrate from the slurry.

5. A process for the production of mono- and diammonium phosphate comprising treating phosphorus-bearing rock with nitric acid to form a slurry, treating the slurry to form a water soluble salt that is insoluble in liquid ammonia, dehydrating the slurry by passing it through a saturated solution of liquid ammonia and ammonium nitrate, and passing the dehydrated slurry through an unsaturated solution of liquid ammonia to dissolve calcium nitrate from the slurry.

6. The process set forth in claim 5 wherein said slurry prior to dehydration is treated with dicalcium phosphate to form monocalcium phosphate.

7. The process set forth in claim 6 wherein said solution of liquid ammonia with ammonium nitrate and calcium nitrate is separated from the monocalcium phosphate and treated with ammonium chloride to form a precipitate of calcium chloride in a solution of liquid ammonia and ammonium nitrate.

8. The process set forth in claim 7 wherein the solution of liquid ammonia and ammonium nitrate is recycled to dissolve additional quantities of calcium nitrate.

9. The process of claim 6 wherein said monocalcium phosphate is reacted with water to form dicalcium phosphate and monoammonium phosphate.

10. The process of claim 9 wherein said dicalcium phosphate is separated from the monoammonium phosphate and recycled to form additional quantities of monocalcium phosphate.

11. The process of claim 9 wherein said solution of liquid ammonia with ammonium nitrate and calcium nitrate is separated from the monocalcium phosphate and treated with ammonium chloride to form a precipitate of calcium chloride in a solution of liquid ammonia and ammonium nitrate.

12. A process for the production of mono- and diammonium phosphate comprising treating phosphorus-bearing rock with nitric acid to form a slurry containing phosphoric acid and calcium nitrate, treating the slurry with dicalcium phosphate to convert the phosphoric acid into monocalcium phosphate, dehydrating the slurry by passing it through a saturated solution of liquid ammonia and ammonium nitrate, passing the monocalcium phosphate and calcium nitrate through an unsaturated solution of liquid ammonia and ammonium nitrate to dissolve the calcium nitrate, separating the monocalcium phosphate from the solution of liquid ammonia and ammonium nitrate and calcium nitrate, reacting the monocalcium phosphate with water to form dicalcium phosphate and monoammonium phosphate, treating the liquid ammonia-ammonium nitrate-calcium nitrate solution with ammonium chloride to form a precipitate of calcium chloride, separating calcium chloride and ammonia from the solution and reacting it with water and carbon dioxide to form ammonium chloride and calcium carbonate.

References Cited
UNITED STATES PATENTS

| | | | |
|---|---|---|---|
| 1,849,704 | 3/1932 | Boller | 23—109 |
| 1,856,187 | 5/1932 | Johnson | 23—107 |
| 1,876,501 | 9/1932 | Johnson | 23—107 |

OSCAR R. VERTIZ, Primary Examiner

HOKE S. MILLER, Assistant Examiner

U.S. Cl. X.R.

23—109